United States Patent [19]

Tanaka et al.

[11] Patent Number: 4,697,237
[45] Date of Patent: Sep. 29, 1987

[54] VEHICLE SUSPENSION APPARATUS

[75] Inventors: Tadao Tanaka; Mitsuhiko Harara, both of Okazaki; Yasutaka Taniguchi; Masanaga Suzumura, both of Nagoya; Minoru Tatemoto, Okazaki; Naotake Kumagai, Aichi, all of Japan

[73] Assignee: Mitsubishi Jidosha Kogyo Kabushiki Kaisha, Tokyo, Japan

[21] Appl. No.: 798,232

[22] Filed: Nov. 14, 1985

[30] Foreign Application Priority Data

Nov. 21, 1984 [JP] Japan ................................ 59-244667
Nov. 21, 1984 [JP] Japan ................................ 59-244668
Nov. 21, 1984 [JP] Japan ................................ 59-244669
Dec. 25, 1984 [JP] Japan ................................ 59-278447

[51] Int. Cl.$^4$ .............................................. B60G 21/06
[52] U.S. Cl. ..................... 364/424; 280/6 H; 280/707
[58] Field of Search .............. 364/424, 425; 180/41; 280/6 H, 6 R, 6.1, 6.11, 707, DIG. 1

[56] References Cited

U.S. PATENT DOCUMENTS

| | | | |
|---|---|---|---|
| 4,345,661 | 8/1982 | Nishikawa | ......................... 280/6 H |
| 4,564,214 | 1/1986 | Tokunaga et al. | ..................... 180/41 |
| 4,616,163 | 10/1986 | Kanai et al. | ......................... 280/707 |
| 4,621,832 | 11/1986 | Nakashima et al. | ................. 280/707 |

*Primary Examiner*—Gary Chin
*Attorney, Agent, or Firm*—Hedman, Gibson, Costigan & Hoare

[57] ABSTRACT

A microcomputer performs roll control and communication control. In roll control, when the steering state detecting means and vehicle velocity detecting means detect a factor which causes a roll state of the vehicle body, a second control signal is produced to open desired supply and exhaust control valve so as to supply a preset amount of fluid to the fluid spring chambers of contracted suspension units and to exhaust a preset amount of fluid from the fluid spring chambers of stretched suspension units. In communication control, a first control signal is supplied to the communicating means to open the communication control valve when the steering state sensor detects that the steering angle falls within a preset steering angle and to close the communication control valve otherwise. After generation of the first control signal, when the steering state sensor detects that the steering direction of the steering wheel is in a return direction toward the neutral position and the steering angular velocity is lower than a preset steering angular velocity, a third control signal is supplied to the communicating means so as to open the communication control valve. When the steering state sensor detects, a third preset time after a second preset time from the generation of the third control signal, that the steering angle has reached the preset neutral range, a fourth control signal is produced to close the communication control valve for a fourth preset time.

13 Claims, 19 Drawing Figures

FIG. 2

| VALVE NO. | 32 | 223 | 273 | 224 | 274 | 242 | 221 | 271 | 222 | 272 | 241 | 30 |
|---|---|---|---|---|---|---|---|---|---|---|---|---|
| NAME / MODE | SELECTION OF EX. PATH | FL SUP. | FL EX. | FR SUP. | FR EX. | FR & FL COMMUNICATE | RL SUP. | RL EX. | RR SUP. | RR EX. | RR & RL COMMUNICATE | SELECTION OF SUP. PATH |
| NORMAL | X | X | X | X | X | O | X | X | X | X | O | X |
| HEIGHT CONT. F UP | X | O | X | O | X | O | X | X | X | X | O | X |
| HEIGHT CONT. R UP | X | X | X | X | X | O | O | X | O | X | O | X |
| HEIGHT CONT. F&R UP | X | O | X | O | X | O | O | X | O | X | O | X |
| HEIGHT CONT. F DOWN | X | X | O | X | O | O | X | X | X | X | O | X |
| HEIGHT CONT. R DOWN | X | X | X | X | X | O | X | O | X | O | O | X |
| HEIGHT CONT. F&R DOWN | X | X | O | X | O | O | X | O | X | O | O | X |
| L.ROLL CONT. START | O | O | X | X | O | X | O | X | X | O | X | O |
| L.ROLL CONT. HOLD | O | X | X | X | X | X | X | X | X | X | X | O |
| L.ROLL CONT. RETURN | X | X | X | X | X | O | X | X | X | X | O | X |
| R.ROLL CONT. START | O | X | O | O | X | X | X | O | O | X | X | O |
| R.ROLL CONT. HOLD | O | X | X | X | X | X | X | X | X | X | X | O |
| R.ROLL CONT. RETURN | X | X | X | X | X | O | X | X | X | X | O | X |
| NOSE DIVE CONT. START | O | O | X | O | X | X | X | O | X | O | X | O |
| NOSE DIVE CONT. HOLD | O | X | X | X | X | X | X | X | X | X | X | O |
| NOSE DIVE CONT. RETURN | O | X | O | X | O | X | O | X | O | X | X | O |
| SQUAT CONT. START | O | X | O | X | O | X | O | X | O | X | X | O |
| SQUAT CONT. HOLD | O | X | X | X | X | X | X | X | X | X | X | O |
| SQUAT CONT. RETURN | O | O | X | O | X | X | X | O | X | O | X | O |

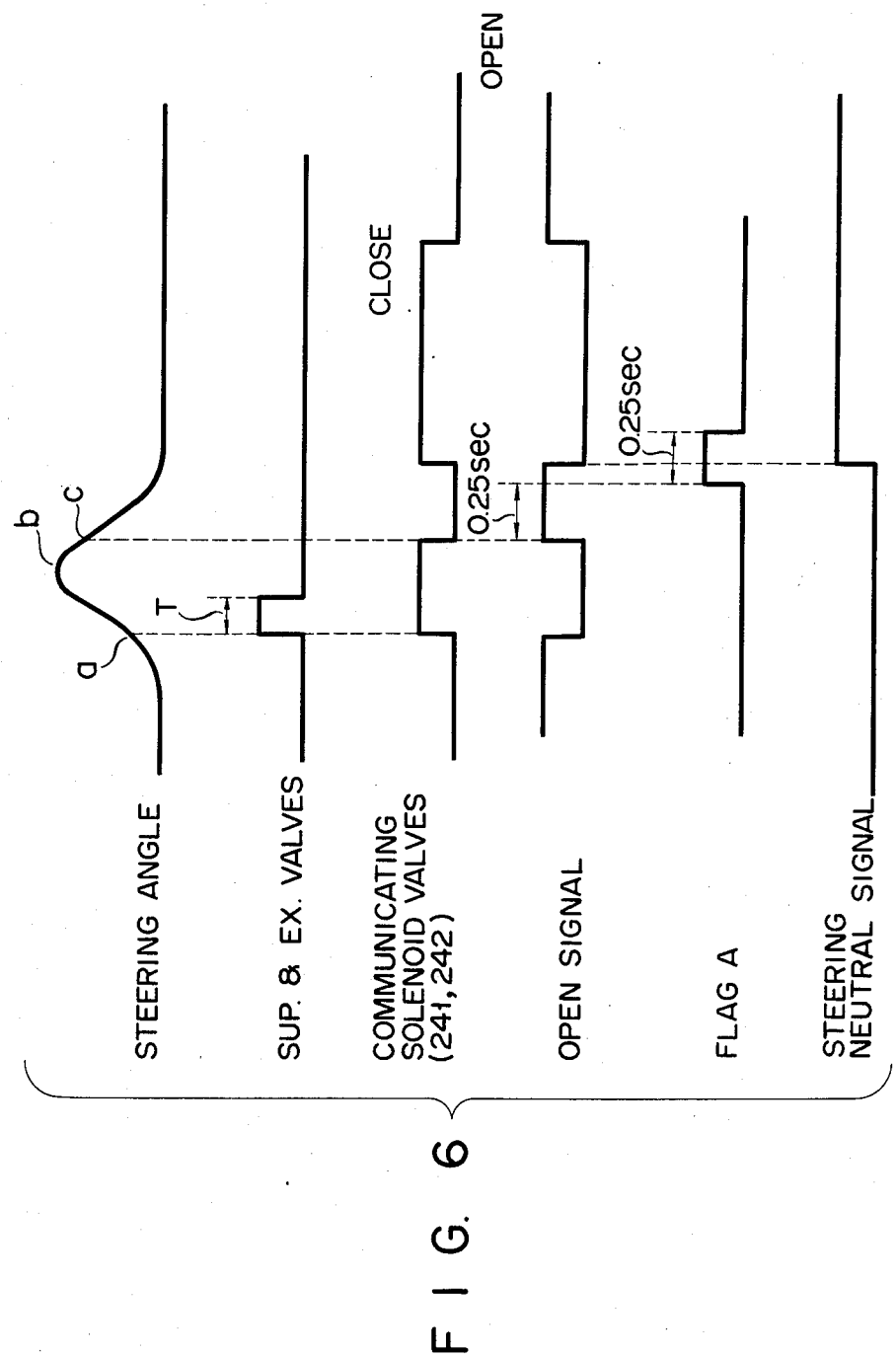

VEHICLE SUSPENSION APPARATUS

BACKGROUND OF THE INVENTION

The present invention relates to a vehicle suspension apparatus which can reduce roll back of a vehicle body when the steering wheel is quickly returned to the neutral position during vehicle travel.

In order to reduce rolling of a vehicle making a turn, the present applicant previously proposed a vehicle suspension apparatus comprising: fluid spring chambers arranged for suspension units supporting respective wheels of the vehicle; fluid supply means for supplying a fluid to the fluid spring chambers through corresponding supply control valve means; fluid exhaust means for exhausting the fluid from the fluid spring chambers through corresponding exhaust control valve means; communicating means for communicating the fluid spring chambers of the left suspension units with those of the right suspension units through communication control valve means; steering state detecting means for detecting the steering state of the steering wheel; communication control means for supplying a control signal to the communicating means so as to open the communication control valve means when the steering angle is detected to fall within a preset neutral range by the steering state detecting means and for supplying a control signal to the communication means so as to close the communication control valve means when the steering angle is detected to fall outside the neutral range by the steering state detecting means; and roll control means for producing a control signal for suppling a preset amount of a fluid to the fluid spring chambers of the contracted suspension units and for exhausting a preset amount of the fluid from the fluid spring chambers of the stretched suspension units when the steering state detecting means and vehicle velocity detecting means detect a factor which causes rolling of the vehicle body.

However, the above apparatus is subject to the following problem. Assume a state wherein the steering wheel is quickly operated in order to avoid an obstacle on the road during high-speed travel and the steering wheel is then quickly returned to the neutral position. In this case, while the vehicle body quickly returns from the roll state to the neutral state, the communication control means opens the communication control valve means of the communicating means. Then, the roll rigidity of the vehicle body is reduced. When this occurs, the vehicle body rolls to the opposite side exceeding the neutral position, thereby causing roll back of the vehicle body.

SUMMARY OF THE INVENTION

The present invention has been made in consideration of this and has as its object to provide a vehicle suspension apparatus which can hold the roll rigidity of the vehicle body at a high level and reduce roll back of the vehicle body when the steering wheel is quickly returned to the neutral position.

In order to achieve the above object of the present invention, there is provided a vehicle suspension apparatus comprising: fluid spring chambers arranged for suspension units supporting respective wheels; fluid supplymeans for supplying a fluid to the fluid spring chambers through supply control valve means, respectively; fluid exhaust means for exhausting a fluid from the fluid spring chambers through exhaust control valve means, respectively; communicating means for communicating the fluid spring chambers of the left suspension units with those of the right suspension units through communication control valve means; steering state detecting means for detecting the steering state of the steering wheel; communication control means for supplying a first control signal to the communicating means so as to open the communication control valve means when the steering angle is detected to fall within a neutral range by the steering state detecting means and to close the communication control valve means when the steering angle is detected to fall outside the neutral range by the steering state detecting means; and roll control means for producing a second control signal for opening desired supply and exhaust control valve means for a first preset time so as to supply a preset amount of the fluid to the fluid spring chambers of the contracted suspension units and to exhaust a preset amount of the fluid from the fluid spring chambers of the stretched suspension units when the steering state detecting means and vehicle velocity detecting means detect a factor which causes rolling of the vehicle body, characterized in that said communication control means supplies a third control signal to the communicating means so as to open the communication control vavle means when the steering state detecting means detects that the steering direction of the steering wheel is the return direction and the steering angular velocity exceeds a preset value after the execution of the roll control means, and supplies a fourth control signal to close the communication control valve means for a fourth preset time when the steering state detecting means detects, within a third preset time after a second time elapsed from production of the third control signal, that the steering angle has reached the neutral range.

BRIEF DESCRIPTION OF THE DRAWINGS

FIG. 2 is a table showing open/closed states of respective valves shown in FIG. 1 in respective control modes;

FIG. 3A is a circuit diagram showing the state wherein each valve shown in FIG. 1 is turned on;

FIG. 6 shows a timing charge for explaining the mode of operation of the first embodiment;

DETAILED DESCRIPTION OF THE PREFERRED EMBODIMENTS

The present invention will be described in detail with reference to the preferred embodiment and in conjunction with the accompanying drawings.

A first embodiment of the present invention will be described first with reference to FIGS. 1 to 8.

Figure 1:
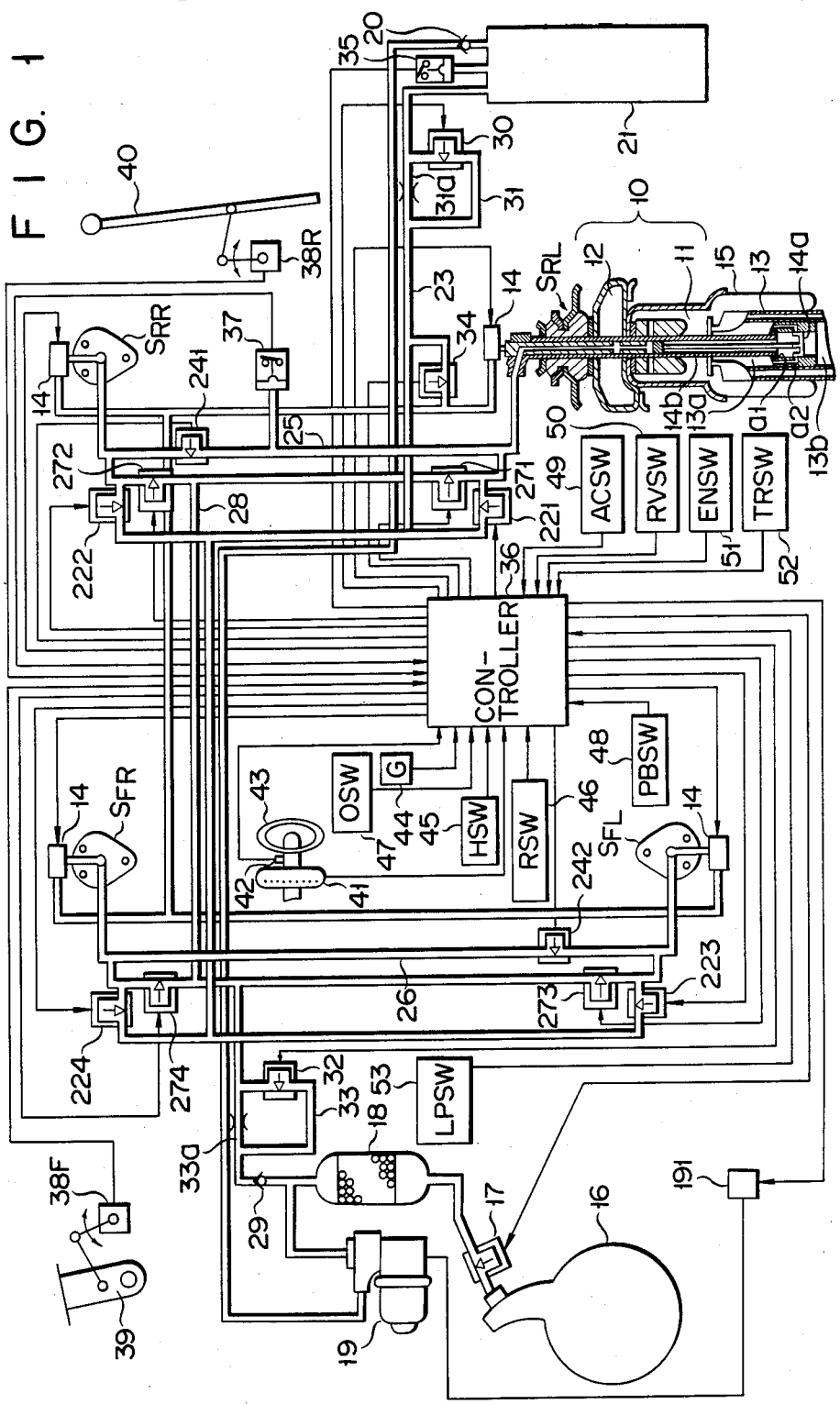
FIG. 1 is a diagram showing the overall configuration of a first embodiment of the present invention.

In FIG. 1, reference numeral $S_{FR}$ denotes a front wheel suspension unit of a vehicle; $S_{FL}$, a front wheel suspension unit; $S_{RR}$, a rear right wheel suspension unit; and $S_{RL}$, a rear left wheel suspension unit. The units $S_{FR}$, $S_{RR}$ and $S_{RL}$ have identical structures and are exemplified by the unit $S_{RL}$. The unit $S_{RL}$ comprises a main air spring chamber 11 and an auxiliary air spring chamber 12, a shock absorber 13 and a coil spring (not shown) used as an auxiliary spring. An air spring 10 consists of the chambers 11 and 12.

Reference numeral 14 designates an actuator for switching the damping force of the shock absorber 13 to hard or soft. The actuator 14 rotatably displaces a damping force switching valve 14a, together with a control rod 14b, to select either one of the states where a first oil chamber 13a, defined by a piston, communicates only through an orifice a1 with a second oil chamber 13b, or where the chamber 12 communicates through both the orifices a1 and a2 with the chamber 13b.

The actuator 14 further rotates the control rod 14b to simultaneously control the communication and the non-communication between the chambers 11 and 12, thereby simultaneously switching between the hard and soft options of the air spring. The actuator 14 is controlled by a controller 36 having a microcomputer. Reference numeral 15 denotes a bellows for defining part of the chamber 11.

Reference numeral 16 denotes an air cleaner. Air received through the cleaner 16 is supplied to a drier 18 through an atmospheric air sealing solenoid valve 17. Air dried by the drier 18 is compressed by a compressor 19 and stored in a reserve tank 21 through a check valve 20. Reference numeral 191 denotes a compresor relay, and reference character 35 denotes a pressure switch which switches ON when the pressure in the tank 21 reaches a set value or lower; a controller 36 controls, via switch 35, the relay 191 ON when the pressure in the tank 21 decreases to a set value or lower.

The tank 21 is connected to the main and auxiliary air spring chambers 11 and 12 in the suspension units through an air intake pipe 23 haivng air supply solenoid valves 221 to 224 respectively. The chambers 11 and 12, in the units $S_{FL}$ and $S_{FR}$, are coupled to each other through a communicating pipe 26 having a communicating solenoid valve 242. Similarly, the chambers 11 and 12, in the units $S_{RL}$ and $S_{RR}$, are coupled to each other through a communicating pipe 25 having a communicating solenoid valve 241.

The compressed air in the suspension unit chambers 11 and 12 is exhausted through an exhaust pipe 28 complete with exhaust solenoid valves 271 to 274, a check valve 29, the drier 18, the valve 17 and the cleaner 16.

An external air shield solenoid valve 17 is opened by a control signal from the controller 36 only when compressed air is exhausted from the chambers 11 and 12 and the compressor 19 is driven.

A pipe 31 having an air intake path selection solenoid valve 30 is arranged in parallel with the pipe 23. When the valve 30 is closed, the compressed air is supplied from the tank 21 to the respective suspension units through only a small-diameter path 31a. However, when the valve 30 is opened, the compressed air is supplied from the tank 21 to the respective suspension units through both the path 31a and the large-diameter path 31.

A pipe having an exhaust path selection solenoid valve 32 is arranged in parallel with the pipe 28. When the valve 32 is closed, the compressed air is exhausted from the respective suspension units to the drier 18 through a small-diameter path 33a. However, when the valve 32 is opened, the compressed air is exhausted through the path 33a and the large-diameter path 33.

A hard/soft selection solenoid valve 34 is inserted between the pipe 23 and the unit 14. The valve 34 is controlled in response to a signal from the controller 36.

Reference numeral 37 denotes a pressure sensor for detecting the internal presure of the chambers 11 and 12 of the rear suspension units $S_{RL}$ and $S_{RR}$. A detection signal from the sensor 37 is supplied to the controller 36.

Reference numeral 38F denotes a front vehicle height sensor mounted between a front right lower arm 39 of a suspension and the vehicle body to detect vehicle height at the vehicle's front end. Reference numeral 38R denotes a rear vehicle height sensor mounted between a rear left lateral rod 40 of a suspension and the vehicle body to detect vehicle height at the rear end of the vehicle. Vehicle height signals from the sensors 38F and 38R are supplied to the controller 36. Each of these sensors 38F and 38R detects the distance between the current level and a normal, high or low vehicle height.

Reference numeral 41 denotes a vehicle velocity sensor for detecting vehicle velocity, while 42 denotes a steering state sensor for detecting both steering angle and a steering angular velocity of a steering vehicle wheel 43. Reference numeral 44 denotes an acceleration (G) sensor for detecting back-and-forth, right-and-left and vertical acceleration. The sensor 44 can be of a type wherein a weight is suspended and a shielding plate, interlocked with the weight, shields light from a light-emitting diode so as to prevent light from reaching a photodiode in the absence of acceleration, acceleration being detected when the weight is inclined or moved so as to allow light from the light-emitting diode to reach the photodiode. Detection signals from the sensor 41, 42 and 44 are supplied to the controller 36.

Reference numeral 45 denotes a vehicle height selection switch for setting vehicle height at a target high vehicle height (HIGH), low vehicle height (LOW) or automatic vehicle height (AUTO), while 46 denotes a position control selection switch (RSW) for controlling position control so as to decrease a change in vehicle body position. Reference numeral 47 denotes a hydraulic sensor (OSW) for detecting the hydraulic pressure of engine lubricant; and 48, a parking brake sensor (PBSW) for detecting the operating state of the parking brake. Reference numeral 49 denotes an accelerator pedal sensor (ACSW) for detecting the state of the accelerator pedal with respect to its being depressed; 50, an engine speed sensor (RVSW) for detecting engine speed; 51, an engine switch (ENSW) such as an ignition switch for starting the engine; 52, a shift position sensor (TRSW) for detecting shift positions (L: low, 2: second, D: drive, N: neutral, R:reverse, and P: parking positions) of an automatic transmission having a fluid drive unit such as a torque converter, not shown; and 53, a pressure sensor (LPSW) for detecting the line pressure in the control of the gear ratio in the automatic transmission. Output signals from the switches 45, 46 and 51, and detection signals from the sensors 47, 48, 49, 50, 52 and 53 are supplied to the controller 36.

Figure 3A:
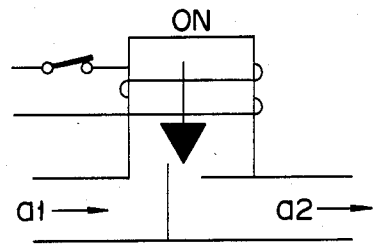
Figure 3B:
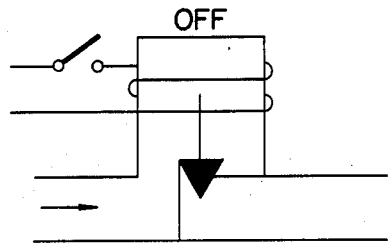
FIG. 3B is a circuit diagram showing the state wherein each valve shown in FIG. 1 is turned off.
Figure 4:
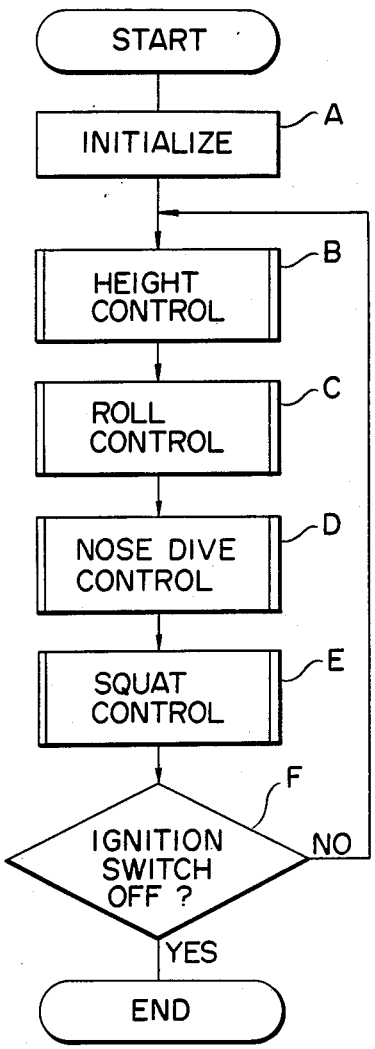
FIG. 4 is a flow chart of the main control flow in the first embodiment.

The valves 17, 221 to 224, 271 to 274, 30 and 34 comprise normally closed valves, while the valves 241 and 242 comprise normally open valves. FIGS. 3A 3B are views illustrating the normally closed valves, with FIG. 3A also showing the state where the valves are energized and open. In this state, air flows as designated by arrows a1 to a2. FIG. 3B shows the state where the valves are not energized. In this state, air flow is interrupted. The normally open valves are not shown, bu- they have an operation reverse to that of the normally closed valves.

The controller 36 compares the target vehicle height set by a vehicle height selection switch 45 with the vehicle heights detected by vehicle height sensors 38F, 38R, and controls the respective valves such that the vehicle height coincides with the target height, thereby controlling the vehicle height.

The position control function can be performed as follows. The controller 36 detects a change in vehicle position and direction in accordance with the outputs from the corresponding sensors, and controls the corresponding solenoid valves so as to negate the change in vehicle body position.

When the vehicle height control described above is to be performed, the valves 30 and 32 are closed to slowly change the vehicle height so as to eliminate discomfort to the driver and passengers. When the position control described above is to be performed, the valves 30 and 32 are opened to cancel influence of a rapid positional change.

The opening/closing states of the respective valves will be described, with reference to FIG. 2 when the above-mentioned vehicle height and position control operations are performed. FIG. 2 shows the opening/closing states of the valves in Fuig. 1, in the respective modes. (Circles represent the opened state, and crosses represent the closed state.)

In the normal mode, only the valves 242 and 241 are opened, so that the air springs 10 in the right and left suspension units communicate with each other. In this state, since the volume of each air spring 10 is substantially increased, the spring constant is decreased to improve riding comfort.

In the vehicle height control mode, vehicle height signals detected by the sensors 38F and 38R are compared with the target vehicle height set by the switches 45. In order to increase the vehicle height, the corresponding supply solenoid valves are opened. Contrastingly, in order to decrease the vehicle height, the corresponding exhaust solenoid valves are opened. In the vehicle height control mode, the valves 242 and 241 are opened to maintain comfort. The valves 30 and 32 are closed in the height control mode. Therefore, height control is performed slowly to maintain the comfort of the driver and passengers.

Roll control comprises a start mode in which the compressed air is supplied to the air spring 10 disposed along the right-and-left direction of the vehicle, and exhausted from the spring 10 which is moved upward; a holding mode in which the state obtained in the start mode is held; and a return mode in which, when the cause of the roll is eliminated, right and left air springs 10 are set at the same pressure.

In the start mode, solenoid valves 241, 242 are closed, and the associated air supply solenoid valves and the associated air exhaust solenoid valves are opened for a predetermined period of time and, at the same time, the valves 30 and 32 are opened to perform briefly the position control operation. In the hold mode, only the path selection solenoid valves are kept open. Under this condition, when a lateral acceleration acting on the vehicle during turning increases, the compressed air must be additionally supplied to and exhausted from the corresponding air spring 10. Such additional supply and exhaust of the compressed air can be quickly performed. In the return mode, only the valves 21 and 242 are opened, so as to restore the same state as in the normal mode.

Braking control (nose dive control) also comprises a start mode in which the compressed air is supplied to the front air spring 10 in a predetermined volume and at the same time, exhausted from the rear air spring 10 in a predetermined volume; a holding mode in which the state obtained in the start mode is maintained; and a return mode in which, when the cause of the nose dive is eliminated, the compressed air is exhausted from the front air springs 10 in a predetermined volume and, at the same time, supplied to the rear air springs 10 in a predetermined volume.

In the start mode, the valves 223, 224, and 271, 272 are opened for a predetermined period of time and; at the same time, the respective path selection solenoid valves are opened. In the hold mode, only the front and rear path selection solenoid valves are opened in the same manner as for roll control. In the return mode, the valves 273, 274 and 221, 222 are opened for a predetermined period of time, and, at the same time, the valves 30 and 32 are kept open.

Acceleration control (squat control) also comprises a start mode in which the compressed air is exhausted from the front air spring 10 in a predetermined volume and supplied to the rear air spring 10 in a predetermined volume; a hold mode in which the state obtained in the start mode is held; and a return mode in which, when the cause of the squat is eliminated, the compressed air is exhausted from the rear air spring 10 and supplied to the front air spring 10 in a predetermined volume.

In the start mode, the valves 273, 274 and 221, 222 are opened for a predetermined period of time and, at the same time, the valves 30 and 32 are opened. In the holding mode, the valves 30 and 32 are kept open in the same manner as in roll control. In the return mode, the compressed air is exhausted from the valves 223 and 224 and supplied to the valves 271 and 272 for a predetermined period of time, the valves 30 and 32 being kept open.

The roll control flow (step C) described above will now be described in detail with reference to the flow chart shown in FIG. 5.

In step S1, the data and flag stored in the controller 36 are cleared to zero and respective power sources are turned on. The data includes data of the steering angle, steering angular velocity and vehicle velocity etc. The flags include flags A and B. As will be described later, the flag A is set at logic level "1" for only 0.5 sec after 0.25 sec from the time at which the steering wheel 43 started to return to the neutral position at a steering angular velocity exceeding a preset velocity. As will also be described later, the flag B is set at logic level "1" for 2 seconds from the time when the steering wheel 43 is returned to the neutral position while the flag A is set at "1".

In step S2, the map memory is reset, that is, a valve control time Tm is reset. In step S3, the communicating solenoid vales 241 and 242 are opened. If the valves have already been opened, they are kept open. Upon processing of step S3, the right and left air spring chambers are kept at the same pressure. In step S4, the steering angle $\theta$ is fetched from the sensor 42, the steering angular velocity $\theta H$ is calculated from the fetched steering angle, the velocity V is fetched from the sensor 41, and the steering angle, steering angular velocity and vehicle velocity are stored at a predetermined memory.

In step S5, it is checked if the flag A is set at logic level "0". In the description to follow, a case will be considered wherein the steering wheel 43 is quickly turned clockwise in order to avoid an obstacle on the road during high-speed travel and then the steering wheel is returned to the neutral position. In this state, the steering angle changes as shown in FIG. 6. Since the steering angle deviates from the neutral range and the steering angular velocity is increased, NO is obtained in steps S6 and S7. The flow advances to step S8. It is checked in step S8 if the steering direction of the steering wheel 43 is clockwise. As described above, the steering wheel 43 is being operated clockwise from the neutral position. Therefore, YES is obtained in steps S8 and S9, and the flow advances to step S10.

In step S10, it is checked if the steering angular velocity $\theta H$ exceeds a preset value $\theta HO$. If YES in step S10, the flow advances to step S11. However, if NO in step S10, the flow advances to step S12. In step S11, a control line tp (t1-t3) is calculated referring to the steering angular velocity-velocity map in FIG. 8 in accordance with the fetched steering angular velocity and vehicle velocity. In step S12, a control time Tp (t1-t3) is calculated referring to the steering angle-velocity map in FIG. 7 in accordance with the fetched steering angle and vehicle velocity.

In step S13, the control time T (Tp - Tm) is calculated. The control time Tm stored in the map memory is set to be zero in the initialization step S2. Therefore, the control time T=Tm. In step S14, it is checked if the control time t is larger than zero. If NO in step S14, the flow returns to step S4 so as to monitor the next change. However, if YES in step S14, the flow advances to step S15 so as to produce a control signal to close the valves 241, 242 and to start roll control for the control time T. Since the steering wheel 43 is being turned clockwise from the neutral position, control of the start mode of left roll control for the control time T is instructed. When this control start is completed, the flow advances to step S16 and the map memory is updated, i.e., T is updated to Tm. Thereafter, the control time Tp is calculated again through steps S4 to S12. If the control time Tp calculated in step S11 or S12 is the same as the previous control time, the control time is calculated to be $T = Tp - Tm (= Tp) = 0$ in step S13. NO is obtained in step S14, the hold mode of the left roll control in FIG. 2 is kept, and the flow returns to the processing of step S4. By these processes, supply and exhaust of air for the control time T is performed as shown in FIG. 6.

Thereafter, as shown in FIG. 6, assume that the steering wheel 43 is kept turned past a maximum point b and the steering direction is changed to the return direction toward the neutral position. Then, the flow advances to step S8 through steps S6 and S7. Since the steering wheel 43 is now being turned counterclockwise, NO is obtained in step S8 and the flow advances to step S17. Since the position of the steering wheel 43 is to the right of the neutral position, YES is obtained in step S17 and the flow advances to step S18.

In step S18, it is checked if the steering angular velocity $\theta H$ exceeds a preset steering angular velocity $\theta O$. Assume that the steering angular velocity exceeds the preset angular velocity past a point c shown in FIG. 6. Then, YES is obtained in step S18, and the flow advances to step S19.

In step S19, the controller 36 produces a control signal so as to open the valves 241 and 242. In step S20, 0.25 sec, e.g., is set in the timer Ta of the controller 36. In step S21, it is checked if the timer Ta has been counted to zero. Processing of step S21 is repeated until the timer Ta is zero. When the timer Ta is zero, the flow advances to step S22. in step S22, the flag A is set at logic level "1", and the flow returns to step S4.

Since the flat A has been set at level "1", NO is obtained in step S5 and the flow advances to step S23. In step S23, it is checked if the timer Tb is set. Since the timer Tb is not set at this time point, NO is obtained in step S23 and the flow advances to step S24. In step S24, 0.25 sec, e.g., is set in the timer Tb, and the flow advances to step S25. In step S25, it is checked if the timer Tb is zero. If YES in step S25, the flow advances to step S26 and the flat A is set at logic level "0". In this manner, the flag A is set at "1" until the timer Tb becomes zero. In other words, as shown in FIG. 6, the flat A is set (logic level "1") for 0.25 sec after 0.25 sec from the point c at which the steering wheel 43 is returned and the steering angular velocity reaches the predetermined steering angular velocity.

Since the timer Tb is not zero initially, NO is obtained in step S25 and the flow advances to step S6. Thereafter, when the steering angle reaches the neutral range, YES is obtained in step S6 and the flow advances to step S27. In step S27, it is checked if the flag A is set at "1". If the steering reaches the neutral range while the flag A is set at "1" as shown in FIG. 6, YES is obtained in step S27 and the flow advances to steps S28 and S29.

In step S28, the communicating solenoid valves 241 and 242 are closed. In step S29, the flag B is set at "1". The flow then advances to step S30. In step S30 it is checked if the timer Tc is set. Since the timer Tc is not initially set, NO is obtained in step S30, and the flow advances to step S31. In step S31, 2.0 sec, e.g., is set in the timer Tc, and the flow advances to step S32. In step S32, it is checked if the timer Tc is zero. If YES in step S32, the flow advances to step S33 and the flag B is set at "0". Thus, the flag B is kept set at "1" until the timer Tc becomes zero.

Since the timer Tc is not initially set at zero, NO is obtained in step S32 and the flow returns to step S4. Processing of steps S4, S5, S23, S25, S6, S27, S28, S29, S30 and S32 is repeated. When the timer Tb becomes zero while the processing of these steps is repeated, YES is obtained in step S25 and the flag a is set at "0" in step S26. NO is then obtained in step S27 and the flow advances to step S34.

In step S34, it is checked if the flag B is set at "1". Since the flag B is set at "1" in step S29, YES is obtained in step S34 and the flow advances to step s28. Processing of steps S28, S29, S30, S32, S4, S6, S27, and S34 is repeated. When the timer Tc becomes zero during this processing, YES is obtained in step S32 and the flag B is set at "0" in step S33. Therefore, NO is obtained in step S34, and the flow returns to step S2. In step S3, the valves 241 and 242 are opened. In this manner, the valves 241 and 242 are closed for 2 seconds after the steering wheel 43 returns to the neutral position, and then the valves are opened. This means that the roll rigidity of the vhicle body is increased for 2 seconds after the steering wheel 43 returns to the neutral position.

If the steering angular velocity is smaller than the preset steering angular velocity and the vehicle velocity is low when the steering wheel 43 is returned to the neutral position, NO is obtained in steps S18 and S35. The flow then returns to step S2. The map memory is reset in step S2, and the valves 241 and 242 are opened in step S3. This is because the absolute magnitude of vehicle body roll is small and the valves 241 and 242 need not be closed if the steering angular velocity is smaller than the preset steering angular velocity and the vehicle velocity is low when the steering wheel 43 is returned to the neutral position.

Even if the steering angular velocity is smaller than the preset steering angular velocity when the steering wheel 43 is returned to the neutral position, if the vehicle velocity V is higher than the preset vehicle velocity V0, YES is obtained ins tep S35 and the flow returns to step S4. Thus, the valves 241 and 242 are kept closed. The valves 241 and 242 are kept closed in this case for the following reason. In this case, the speed of the vehicle body returning from the roll state to the neutral state is small. Therefore, if the valves 241 and 242 are opened immediately, the vehicle body rolls in the roll direction again.

As can be seen from the above description, according to the first embodiment, even if the steering wheel 43 is steered quickly from the steered state at a certain steering angle to the neutral position, roll rigidity of the vehicle body is increased for a preset period of time (2 seconds) from the time at which the steering wheel 43 returns to the neutral position. Therefore, roll back to the vehicle body can be reduced to the minimum.

A second embodiment of the present invention will now be described with reference to FIG. 9.

The vehicle suspension apparatus according to the second embodiment has the same configuration as that of the first embodiment, and is different from the latter in the following respects.

Figure 5A:
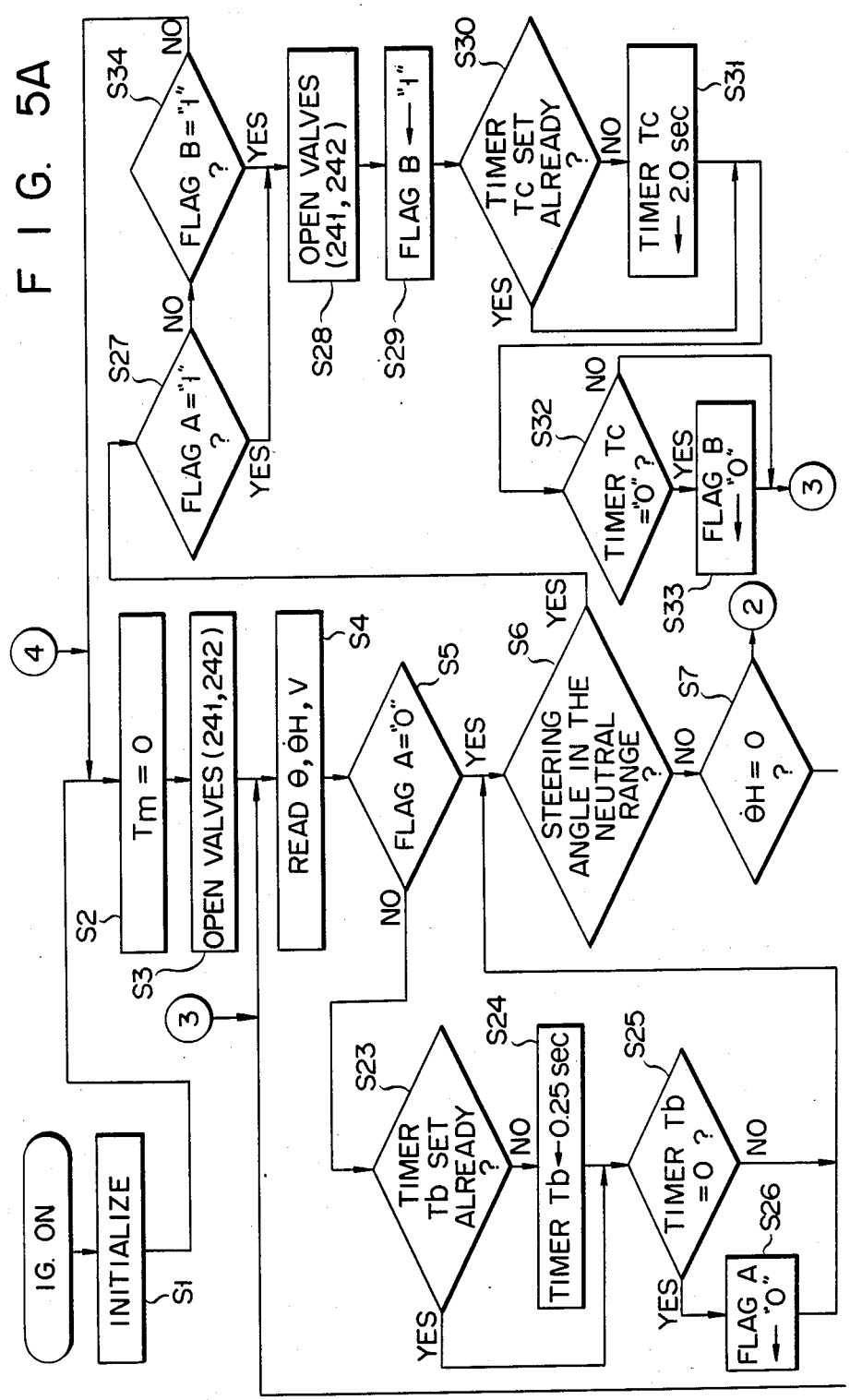
FIGS. 5A and 5B are flow charts showing details of the roll control flow C in FIG. 4.
Figure 5B:
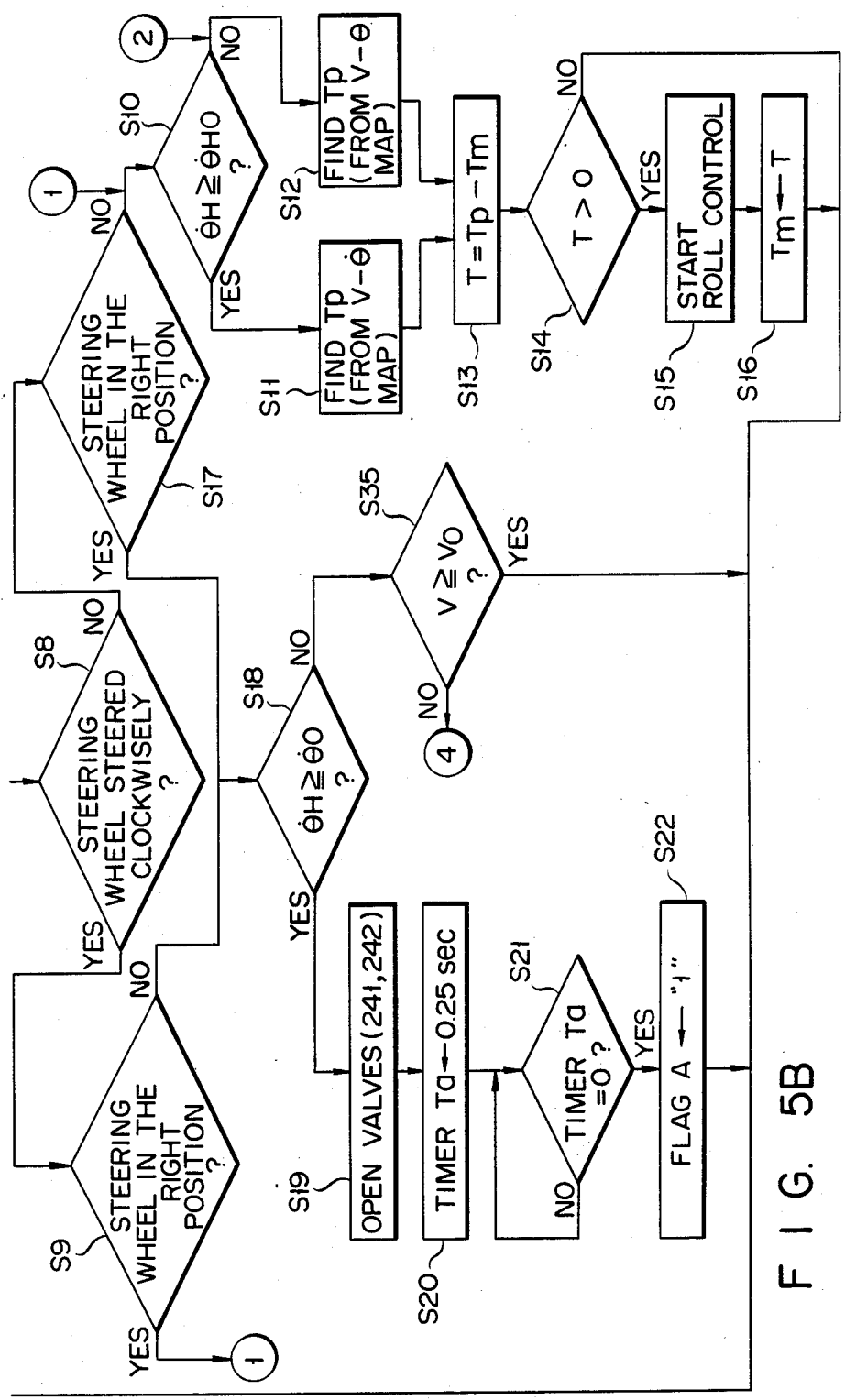
Figure 7:
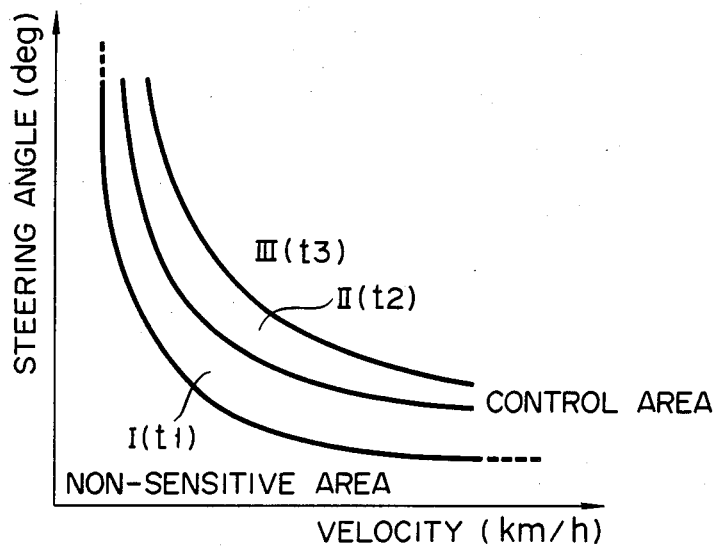
FIG. 7 is a graph showing the steering angle-velocity map in the flow chart shown in FIG. 5.
Figure 8:
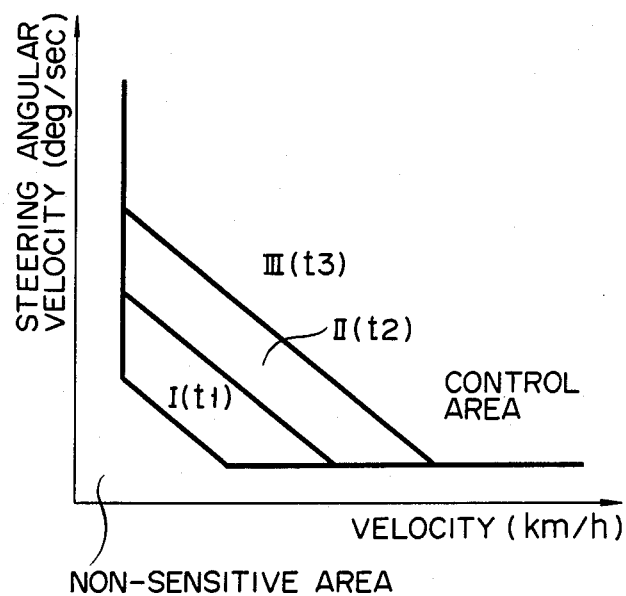
FIG. 8 is a graph showing the steering angular velocity-velocity map in the flow chart shown in FIG. 5.
Figure 9A:
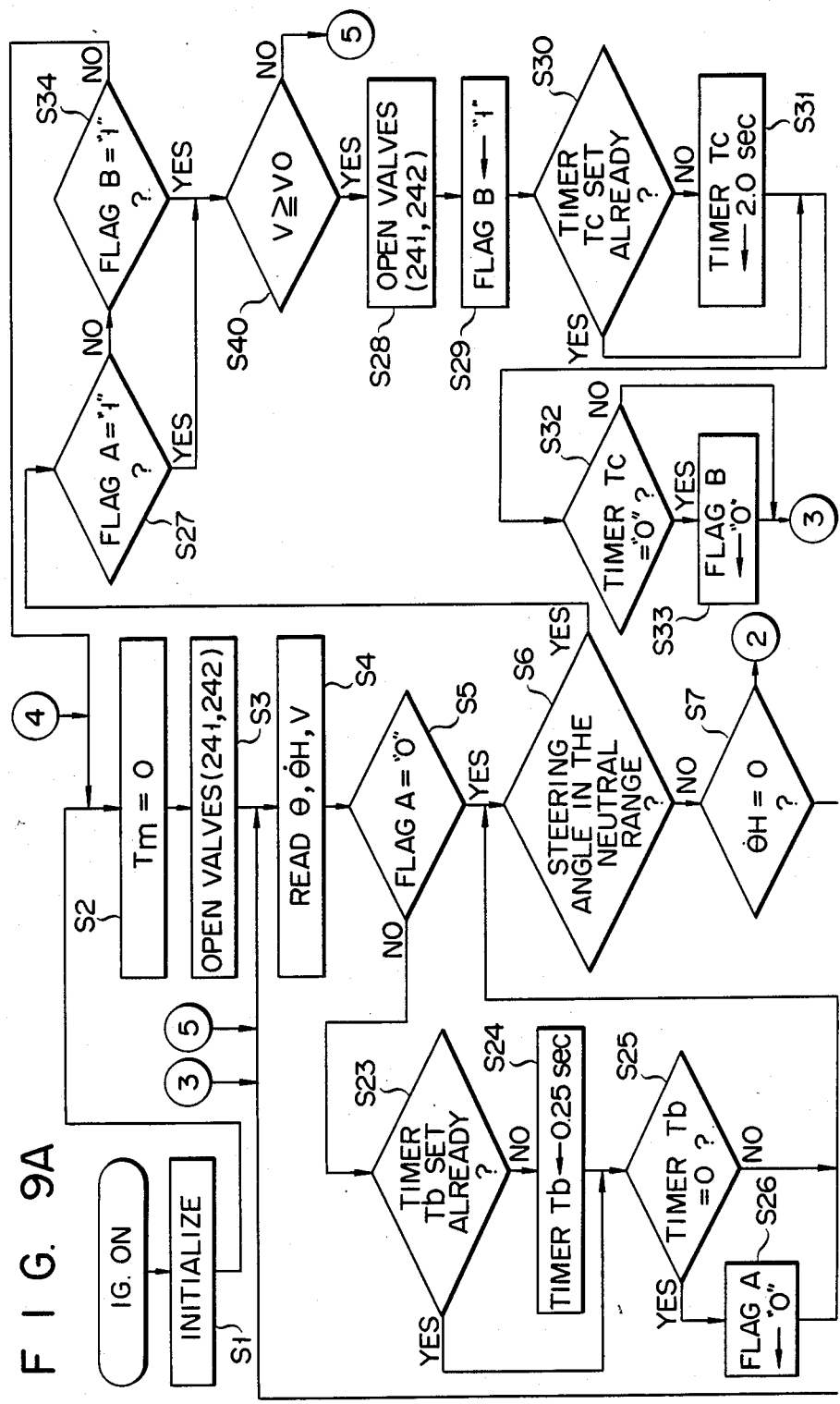
FIGS. 9A and 9B are flow charts according to a second embodiment of the present invention.
Figure 9B:
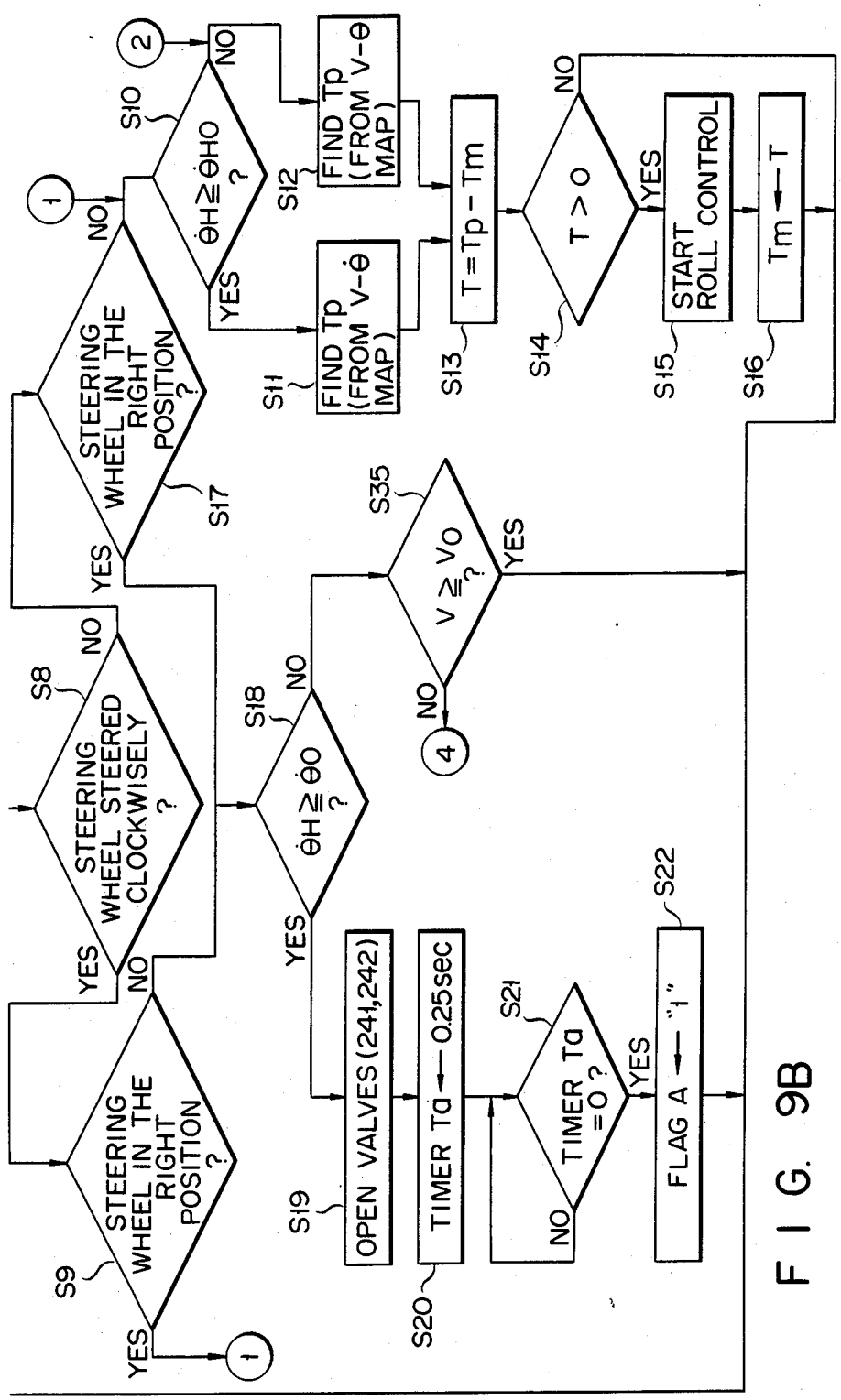

In the second embodiment, in the roll control by the controller 36, as can be seen from FIG. 9, step S40 is inserted before step S28 of the flow chart shown in FIG. 5 of the first embodiment. In step S40, it is checked if the vehicle velocity V fetched from the sensor 41 exceeds a preset vehicle velocity V0. If YES in step S40, the flow advances to step S28. If NO in step S40, the flow returns to step S4.

According to the second embodiment, the following effects can be obtained in addition to those obtained in the first embodiment.

In the second embodiment, step S40 is executed when the flag A or B is set at "1". In other words, step S40 is executed for the time interval until the flag B is set at "0". The flag B has been set at level "1" for 2 seconds when the steering wheel 43 is returned to the neutral position 0.25 seconds after 0.25 second from the time when the steering angular velocity exceeds the preset steering angular velocity in step S18. When it is determined that the vehicle velocity exceeds the preset vehicle velocity during this time interval, processing starting from step S28 is executed as in the case of the first embodiment. However, when it is determined that the vehicle velocity is lower than the preset vehicle velocity, the flow returns to step S4. Therefore, the valves 241 and 242 are not closed in order to prevent roll back.

Even if the vehicle body rolls back, if the vehicle velocity is lower than the preset vehicle velocity, roll back of the vehicle body hardly occurs.

According to the second embodiment, since step S40 is included, unnecessary closing of the valves 241 and 242 can be prevented. Then, the roll rigidity of the vehicle body is not increased when it need not be increased, thereby improving riding comfort of the vehicle.

A third embodiment of the present invention will now be described with reference to FIGS. 10 and 11.

A vehicle suspension apparatus according to the third embodiment has the same configuration as that of the first embodiment, and is different from the latter in the following respects.

Figure 10A:
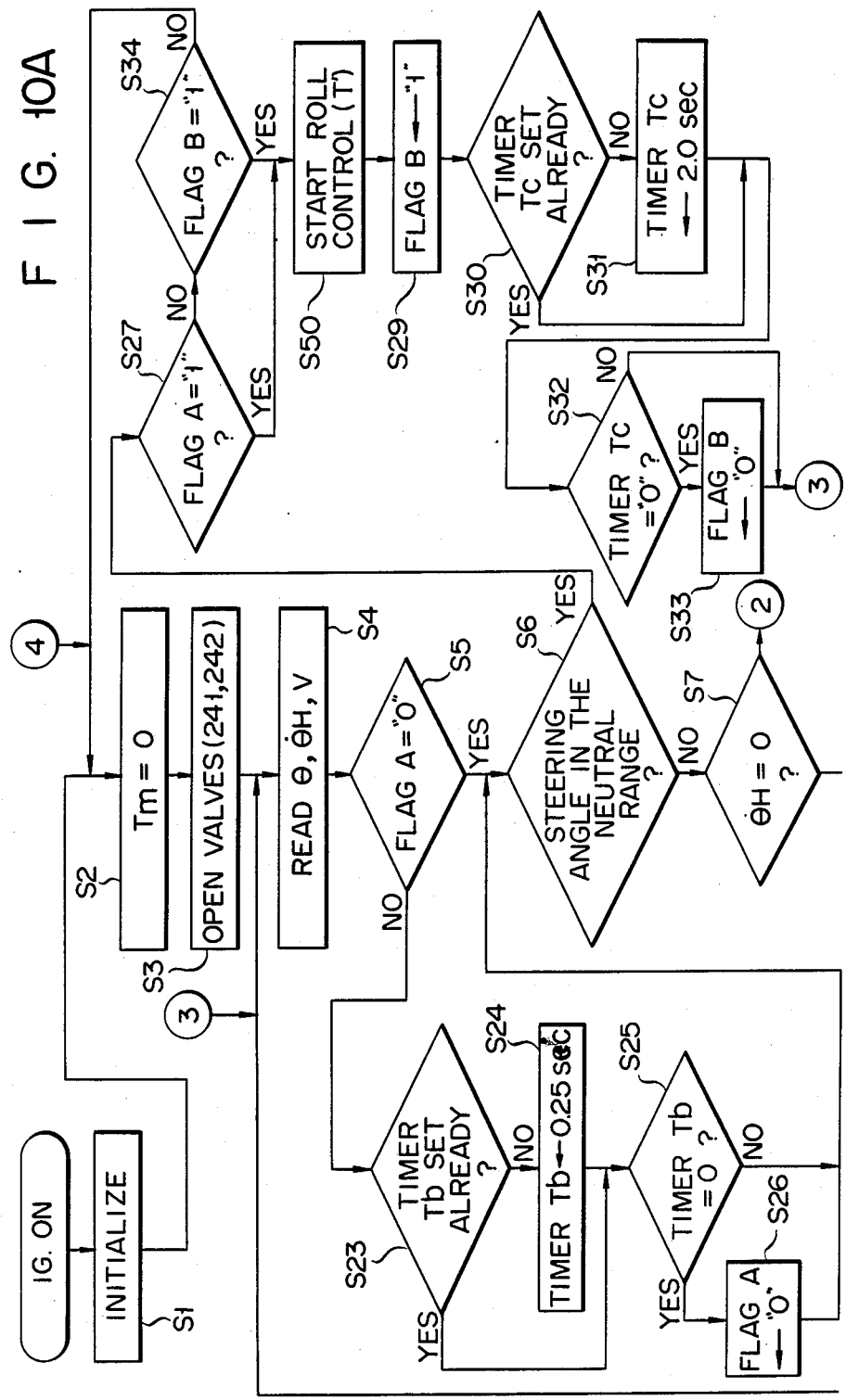
FIGS. 10A and 10B are flow charts according to a third embodiment of the present invention.
Figure 10B:
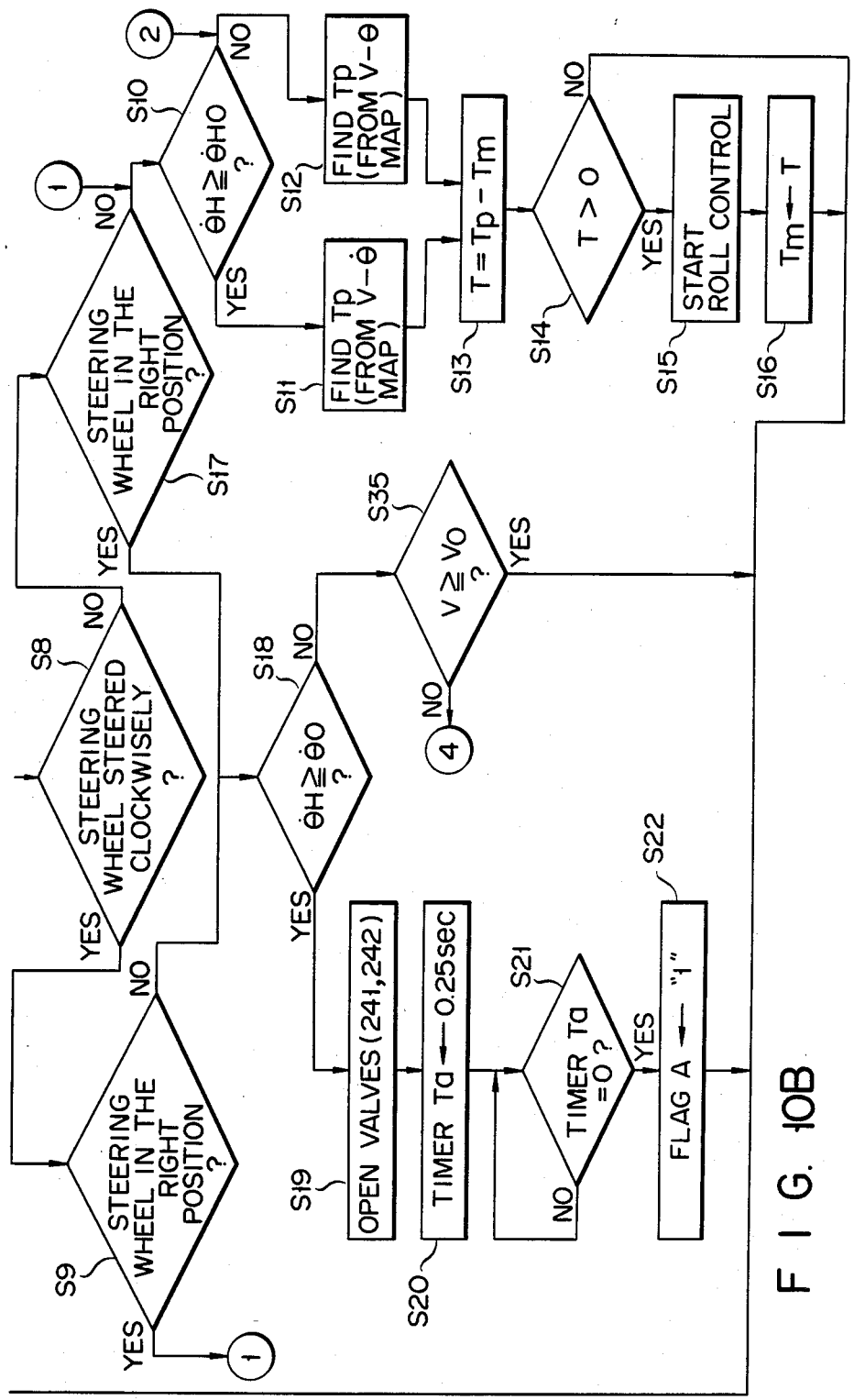
Figure 11:
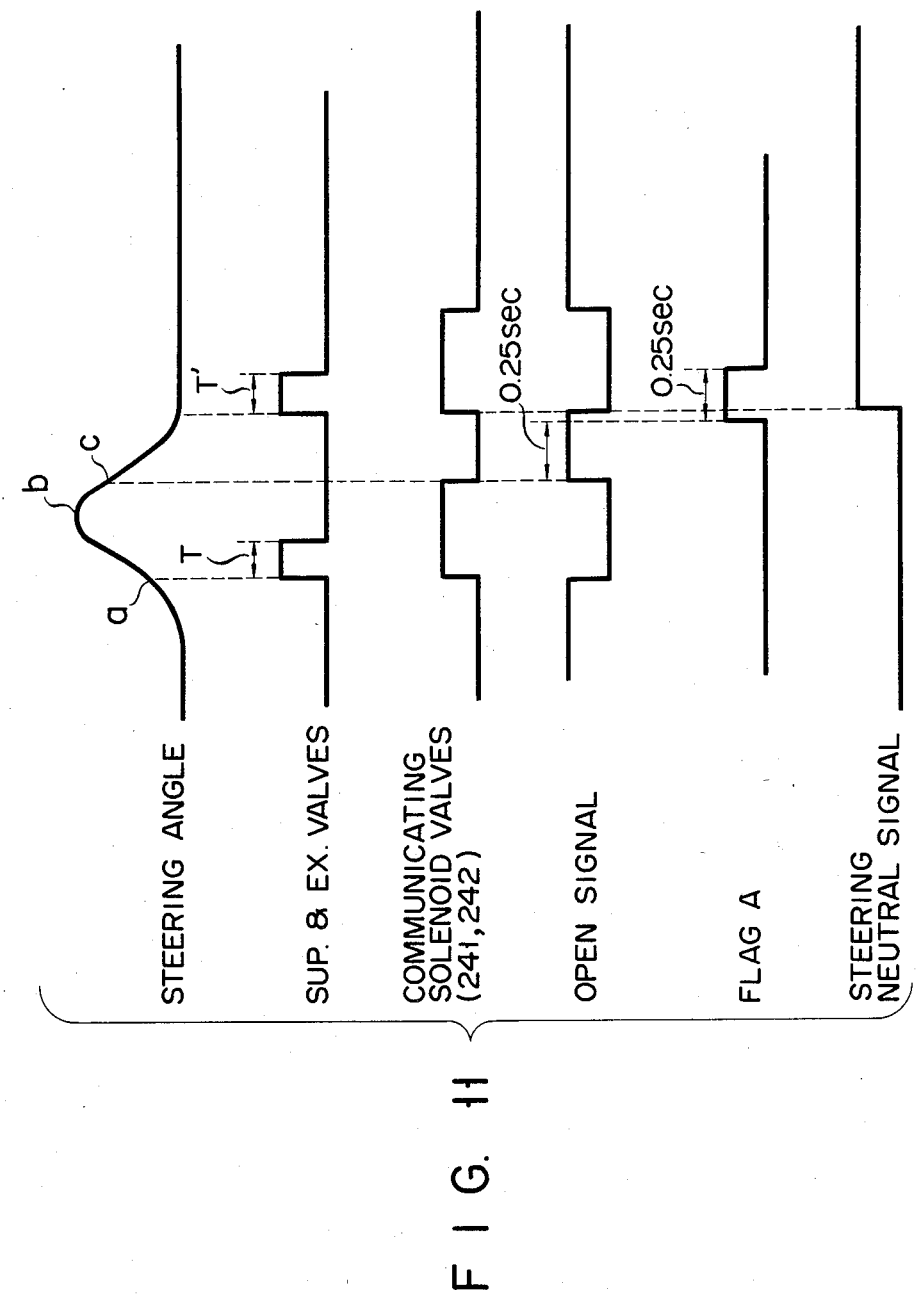
FIG. 11 is a timing chart for explaining the mode of operation of the third embodiment.

According to the third embodiment, in the roll control by the controller 36, as can be seen from FIG. 10, step S50 is inserted in place of step S28 in the flow chart shown in FIG. 5 of the first embodiment. As can be seenfrom FIG. 11, in step S50, a control signal for closing the valves 241 and 242 and a reverse control signal for opening desired supply and exhaust solenoid valves for a preset control time T' so as to perform reverse control to that of step S15 are produced at a specific timing. The specific timing is when the steering wheel 43 returns to the neutral position 0.25 seconds after 0.25 sec from the time at which steering angular velocity exceeds the preset steering angular velocity in step S18 upon steering the steering wheel 43 from a steered state at a certain steering angle to the neutral position. Processing of step S50 is performed once while the flag A or B is set at "1". After step S50 is performed once, the flow passes step S50 but step S50 is not executed.

According to the third embodiment, roll control for preventing roll back of the vehicle body is performed in step S50 when the steering wheel 43 is returned to the neutral position 0.25 seconds after 0.25 sec from the time at which the steering angular velocity exceeds the preset steering angular velocity upon steering the steering wheel 43 from a steered state at a certain steering angle to the neutral position. The effect of preventing roll back in the third embodiment is larger than in the first embodiment.

A fourth embodiment of the present invention will be described with reference in FIGS. 12 and 13.

A vehicle suspension apparatus of the fourth embodiment has the same configuration as that of the first embodiment, and is different from the latter in the following respects.

Figure 12A:
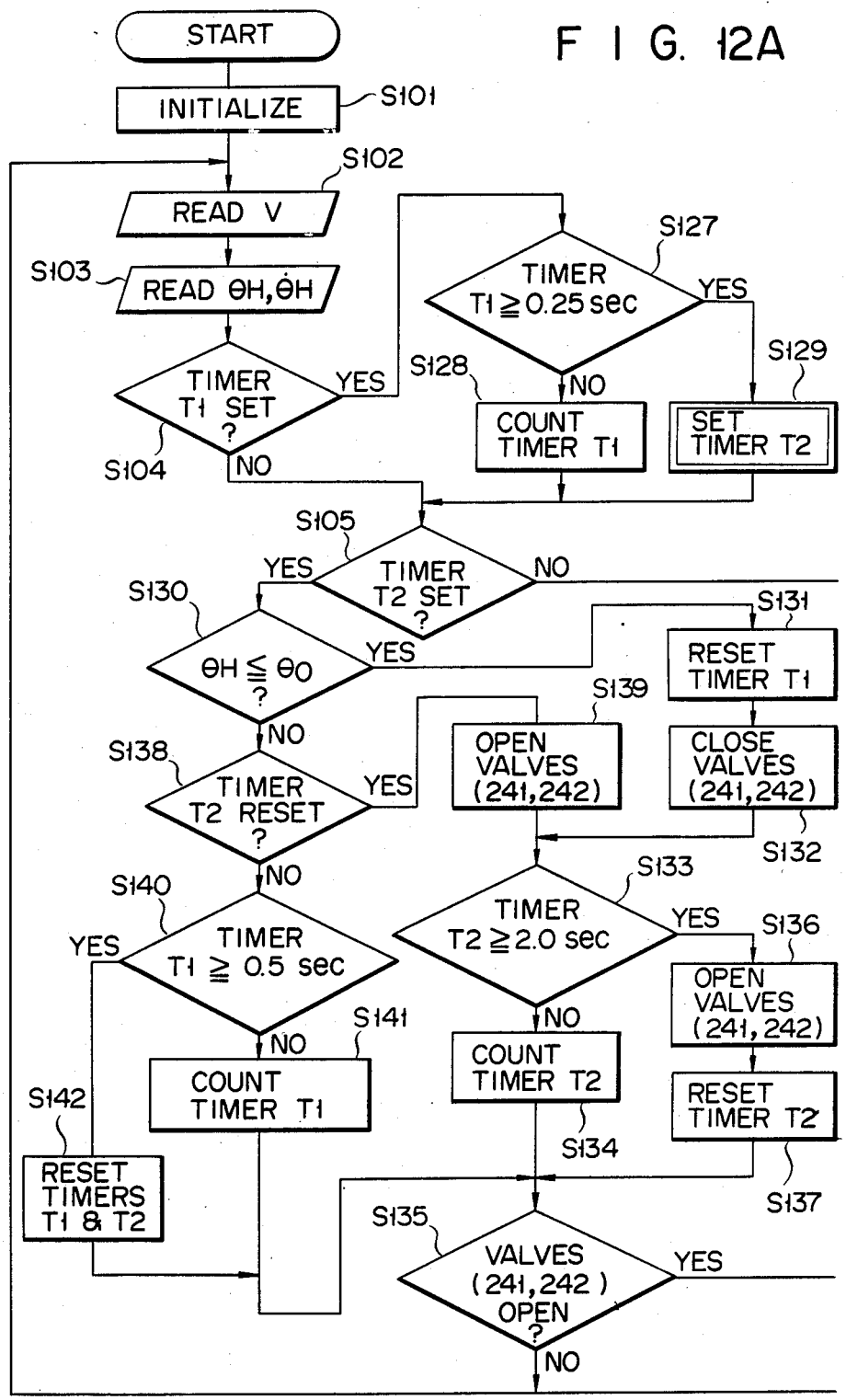
FIGS. 12A to 12C are flow charts according to a fourth embodiment of the present invention.
Figure 12B:
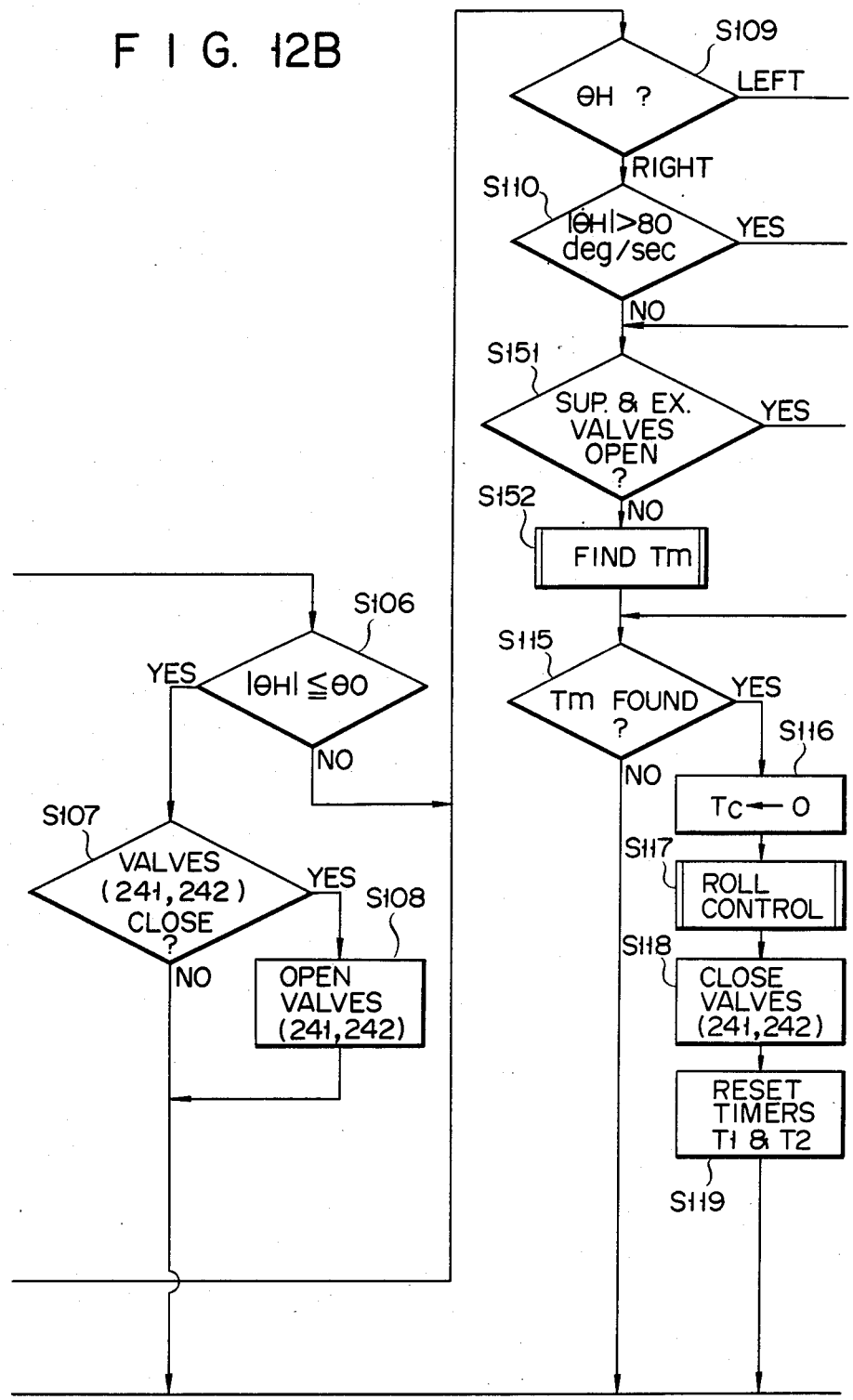
Figure 12C:
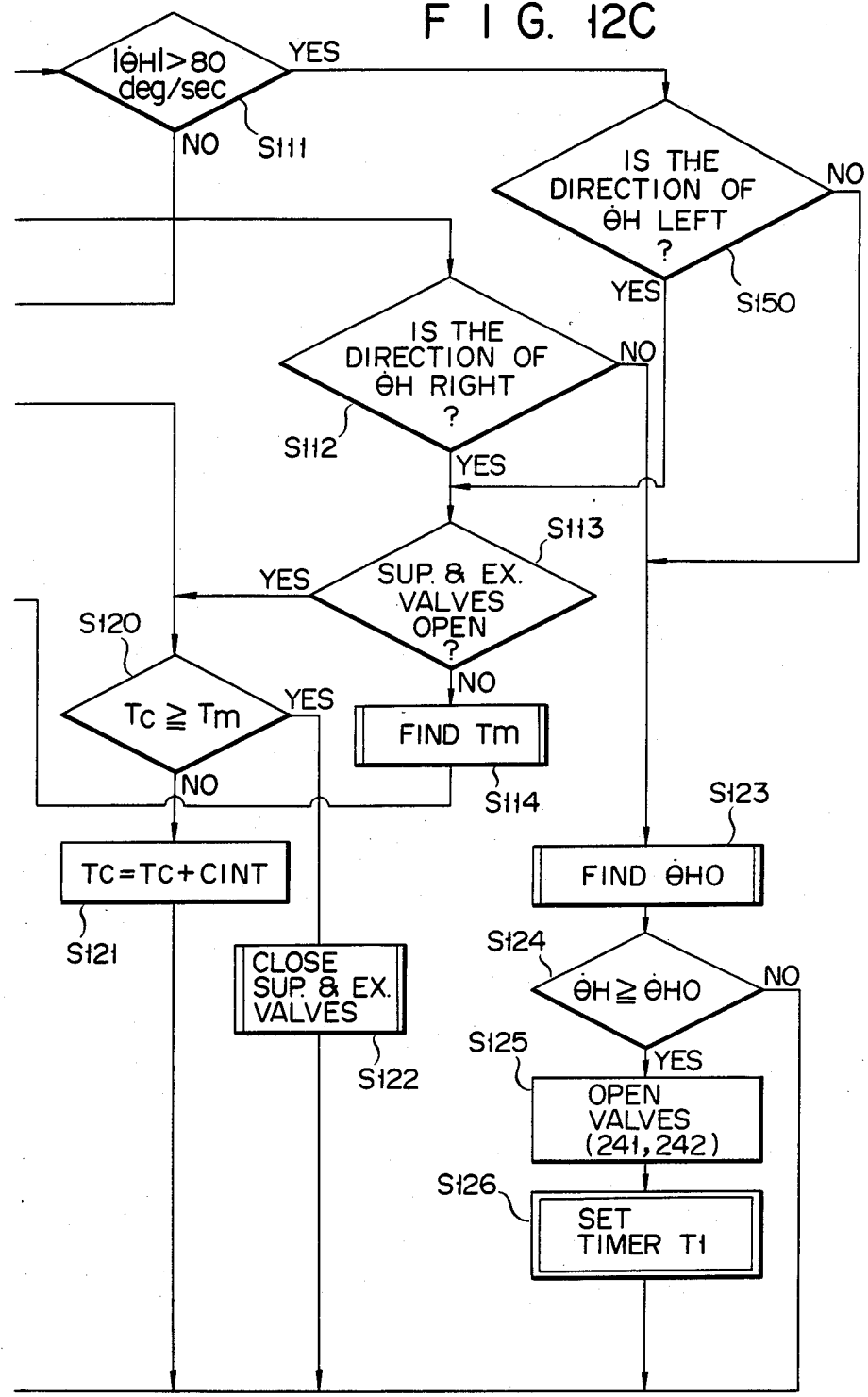
Figure 13:
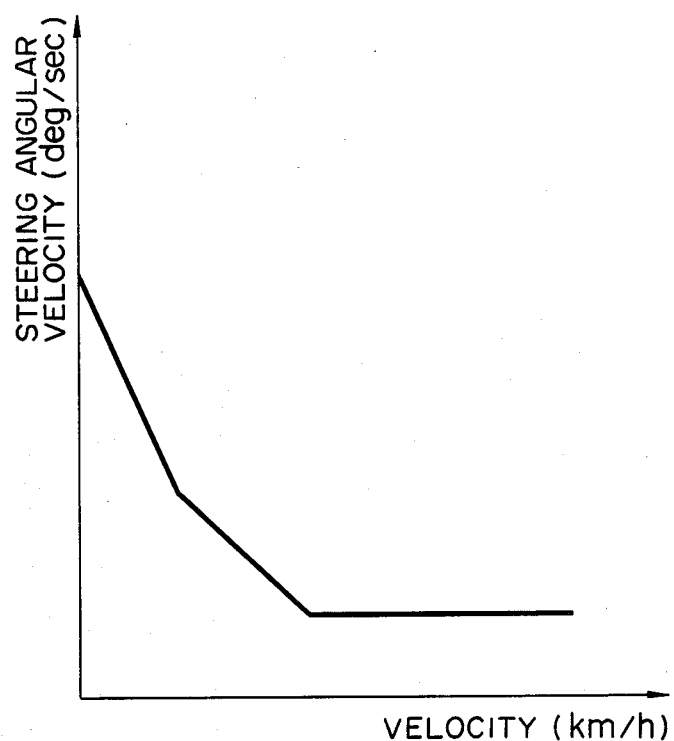
FIG. 13 is a graph showing the steering angular velocity-velocity map of the return side in FIG. 12.

In the fourth embodiment, in the roll control by the controller 36, the flow chart in FIG. 12 is used in place of the flow chart shown in FIG. 5 of the first embodiment.

Roll control by the controller 36 will be described with reference to FIG. 12.

Referring to FIG. 12, in step S101, initialization is performed including resetting of the respective data and T1 and T2 timers. In step S102, the vehicle velocity V is fetched from the sensor 41. In step S103, the steering angle $\theta H$ and the steering angular velocity $\dot\theta H$ are fetched from the sensor 42 into a predetermined memory of the controller 36.

In step S104, it is checked if the T1 timer is set. Since the T1 timer is reset in step S101, NO is obtained in step S104 and it is checked in step S105 if the T2 timer is set. Since the T2 timer is reset in step S101, NO is obtained in step S105 and the flow advances to step S106.

In step S106, it is checked if the absolute value of the steering angle θH fetched in step S103 is below a preset steering angle θO. The preset steering angle θO is set at a small value at which substantially no roll of the vehicle body occurs. When it is determined in step S106 that the absolute value of the steering angle θH is below the preset steering angle θO, that is, the current steering angle θH is so small that it causes almost no roll, YES is obtained and the flow advances to step S107.

In step S107, it is checked if the valves 241 and 242 are closed. When NO is obtained in step S107, since no control process is required, the flow returns to step S102 in order to monitor the next change. When YES is obtained in step S107, the flow advance to step S108. In step S108, a control signal is produced so as to open the valves 241 and 242.

When the steering wheel 43 is not steered or steered only slightly and when the absolute value of the steering angle θH is smaller than the preset steering angle θO, processing of steps S102, S103, S104, S105, S106, and S107 is repeated. The valves 241 and 242 are kept open, and no roll control is performed.

When the steering wheel 43 is steered to a steering angle θH having an absolute value larger than the preset steering angle θO, YES is obtained in step S106 and the flow advances to roll control starting from step S109.

In step S109, it is checked if the steering angle θH of the steering wheel 43 is to the left or right of the neutral position. When it is determined that the steering wheel 43 is steered to the right, the flow advances to step S110. However, when it is determined that the steering wheel 43 is steered to the left, the flow advances to step S111.

The following description will be made with reference to a case wherein the steering wheel 43 is returned to the neutral position from a clockwise steered position. It is first checked in step S110 if the steering angular velocity θ̇H is larger than a preset steering angular velocity (e.g., 80 deg/sec). If the steering wheel 43 is steered at a steering angular velocity exceeding the preset steering angular velocity, YES is obtained and the flow advances to step S112. In step S112, it is checked if the direction of the steering angular velocity θ̇H is clockwise. Since the steering wheel 43 is steered clockwise in this case, YES is obtained and the flow advances to step S113. In step S113, it is checked if the valves 221 to 224 and 271 to 274 are turned on. Since initially no valves 221 to 224 and 271 to 274 are turned on, NO is obtained and the flow advances to step S114. In step S114, a control time Tm is calculated referring to the steering angular velocity-velocity map in FIG. 8 in accordance with the steering angular velocity θ̇H and vehicle velocity V fetched in step S103. In step S115, it is checked if the control time Tm is calculated. Since the control time Tm is calculated in this case, YES is obtained in step S115 and the flow advances to step S116.

In step S116, the control time Tc is set to be zero. In step S117, a control signal is produced so as to execute control start of left roll control shown in FIG. 2. In step S118, a control signal is produced so as to close the valves 241 and 242. In steps S117 and S118, valves indicated with circles in the start mode of left roll control in FIG. 2 are opened. In step S119, the T1 and T2 timers are reset, and the flow returns to step S102 to monitor the next change. When the steering wheel 43 continues to be steered in the same direction at a steering angular velocity larger than the preset steering angular velocity, the flow advances to step S113 through steps S103, S104, S105, S106, S109, S110, and S112. Since desired ones of the valves 221 to 224 and 271 to 274 have been turned on in step S117, YES is obtained in step S113 and the flow advances to step S120.

In step S120, it is checked if the control time Tc for which the control process is performed is longer than the control time Tm calculated in step S114. If NO in step S120, the flow advances to step S121 and the control time Tc is counted up. That is, CINT is added to Tc. When step S121 is completed, the flow returns to step S102 so as to monitor then ext change. Processing of steps S102, S103, S104, S105, S106, S109, S110, S112, S113 and S120 is repeated until YES is obtained in step S120. When the control time Tc exceeds the control time Tm and YES is obtained in step S120, the flow advances to step S122. In step S122, the valves opened in step S117 are closed. That is, valves excluding those indicated with circles in the left roll control hold mode in FIG. 2 are closed. After step S122, the flow returns to step S102 so as to monitor the next change.

Thereafter, when the steering wheel 43 begins to be returned to the neutral position, NO is obtained in step S112 and the flow advances to step S123. In step S123, the threshold value of the return steering angular velocity corresponding to the current vehicle velocity is calculated referring to the return steering angular velocity-velocity map in FIG. 13 in accordance with the vehicle velocity fetched in step S102. In step S124, it is checked if the steering angular velocity fetched in step S103 is larger than the threshold value θ̇HO calculated in step S123. As can be seen from FIG. 13, the return steering angular velocity-velocity map is set such that the threshold value of the steering angular velocity for determining if the valves 241 and 242 are to be opened is decreased as the vehicle velocity increases.

When YES is obtained in step S124, that is, when it is determined that the return steering angular velocity of the steering wheel 43 toward the neutral position is high, the flow advances to step S125. In step S125, a control signal is produced to open the valves 241 and 242. In step S126, the T1 tmer is set and the flow returns to step S102. The flow advances to step S104 through step S103. Since the T1 timer is set in step S126, NO is obtained in step S104, and the flow advances to step S127.

It is checked in step S127 if the T1 timer has counted over 0.25 seconds. NO is initially obtained in step S127, and the T1 counter counts in step S128. If YES is obtained in step S127, that is, if it is determined that the T1 timer has counted over 0.25 seconds, the flow advances to step S129. In step S129, the T1 timer is set, that is, the T2 timer starts counting. In this manner, that T2 timer is set 0.25 seconds after the T1 timer is set. YES is obtained in step S105, and the flow advances to step S130.

In step S130, it is checked if the absolute value of the steering angle θH fetched in step S103 is smaller than the preset steering angle θO. The preset steering angle θO is set at a small value so that no roll of the vehicle body is caused. When the steering wheel 43 is returned to the neutral position, YES is obtained in step S130, and the flow advances to step S131.

In step S131, the T1 timer is reset. In step S132, a control signal is produced so as to close the valves 241 and 242. In step S133, it is checked if the T2 timer has counted over 2.0 seconds. NO is initially obtained in step S133, and the flow advances to step S134. In step S134, the T2 timer counts. In step S135, it is checked if the valves 241 and 242 are open. Since the valves 241 and 242 are closed in step S132, NO is obtained in step S135 and the flow returns to step S102.

When the T2 timer counts over 2.0 second while the steering angle of the steering wheel 43 is within a region in which YES is obtained in step S130, YES is obtained in step S133 and the flow advances to step S136. In step S136, a control signal is produced so as to open the valves 241 and 242. In step S137, the T2 timer is reset. In step S135, it is checked if the valves 241 and 242 are open. Since the valves 241 and 242 have been opened in step S136, YES is obtained in step S135 and roll control determination and execution starting from step S109 is started.

When NO is obtained in step S130, that is, when it is determined that the absolute value of the steering angle $\theta H$ is larger than the preset steering angle $\theta O$, determination processing starting from step S138 is executed. In step S138, it is checked if the T1 timer is reset. If the T1 timer has been reset in step S131 and the valves 241 and 242 have been closed in step S132, YES is obtained in step S138 and the flow advances to step S139. In step S139, the valves 241 and 242 are opened. Thereafter, processing starting from step S133 is executed.

If NO is obtained in step S138 described above, the flow advances to step S140. In step S140, it is checked if the T1 timer has counted over 0.5 seconds. When NO is obtained in step S140, the flow advances to step S141 and the T1 timer is counted up. When step S141 is completed, the flow advances to step S135. Since the valves 241 and 242 have been opened in step S125, YES is obtained in step S135 and roll control determination and execution starting from step S109 is executed. When YES is obtained in step S140, the T1 and T2 timers are reset in step S142 and the flow advances to step S135.

The above description has been made with reference to the case wherein the steering wheel 43 is quickly steered clockwise and then returned to the neutral position. However, when the steering wheel 43 is quickly steered counterclockwise and is then returned toward the neutral position, "left position", YES, and YES are determined in steps S109, S111 and S150, and processing starting from step S113 is executed. Therefore, when the steering wheel 43 is quickly steered back toward the neutral position, NO is obtained in step S113 and processing starting from step S123 is executed.

When NO is obtained in step S110 or S111, that is, when it is determined that the steering angular velocity of the steering wheel 43 is small, the flow advances to step S151. It is checked in step S151 if the valves 221 to 224 and 271 to 274 are turned on. If the valves are not turned on, NO is obtained in step S151 and the flow advances to step S152. In step S152, the control time Tm is calculated referring to the steering angle-velocity map shown in FIG. 7 in accordance with the steering angle $\theta H$ and vehicle velocity fetched in step S103. After step S152, the flow advances to processing starting from step S115.

According to the fourth embodiment of the present invention, the following effect can be obtained in addition to those obtained in the first embodiment. Thus, in the fourth embodiment, the threshold value for determining if the valves 241 and 242 are to be opened when the steering wheel 43 is returned to the neutral position is calculated referring to the return steering angular velocity-velocity map in FIG. 13. Thus, a condition determining if roll back of the vehicle body occurs when the steering wheel 43 is returned to the neutral position, that is, if the speed of change from the roll state to the neutral state is large is determined correctly from the steering angular velocity and vehicle velocity. Therefore, control of still higher precision than in the first embodiment can be performed.

In the above embodiments, air spring suspension units are described. However, the present invention can be similarly applied to suspension units of hydropeumatic type.

In each of the embodiments described above, a second reserve tank for containing air exhausted from the respective air spring chambers can be provided. The second reserve tank can be connected to the suction side of the compresor 19 so as to obtain a closed pneumatic loop system.

What is claimed is:

1. A vehicle suspension appartus comprising:
   fluid spring chambers arranged as suspension units for supporting respective vehicle wheels;
   fluid supply means for supplying a fluid from each of said fluid spring chambers through exhaust control valve means;
   fluid exhaust means for exhausting the fluid from each of said fluid spring chambers through exhaust control valve means;
   communicating means for communicating each of said fluid spring chambers of the left suspension units with each of said fluid spring chambers of the right suspension units through communication control valve means;
   steering state detecting means for detecting the steering state of a steering wheel;
   roll control means for producing a second control signal for opening the desired one of said supply control valve means for a first preset time so as to supply a preset amount of a fluid to said fluid spring chambers of the contracted suspension units and opening the desired one of said exhaust control valve means for said first preset time so as to exhaust a preset amount of the fluid from said fluid spring chambers of the stretched suspension units when said steering state detecting means and vehicle velocity detecting means detect a factor with causes rolling of a vehicle body; and
   communication control means for supplying a first control signal to said communicating means so as to open said communication control valve means when said steering state detecting means detects that the steering angle falls within a preset neutral range and to close said communication control valve means when said steering state detecting means detects that the steering angle falls outside the neutral range, said communication control means supplying a third control signal to said communicating means so as to open said communication control valve means when said steering state detecting means detects, after control by said roll control means, that the steering direction of said steering wheel is in a return direction toward a neutral direction and the steering angularly velocity is higher than a first preset steering angular velocity, and said communication control means supplying a fourth control signal to close said communication control valve means for a fourth preset time when said steering state detection means detect, during a third preset time period after a second preset time from production of the third control signal, that the steering angle falls within the neutral range.

2. A vehicle suspension apparatus according to claim 1, wherein said communication control means prohibits output of the fourth control signal when the vehicle velocity detected by said vehicle velocity detecting means is below a first preset vehicle velocity.

3. A vehicle suspension apparatus according to claim 1, wherein the first preset steering angular velocity for producing the third control signal by said communication control means is set to decrease when the vehicle velocity detected by said vehicle velocity detecting means increases.

4. A vehicle suspension apparatus according to claim 1, wherein said roll control means determines that the factor which causes rolling of the vehicle body is present when the steering angular velocity detected by said steering state detecting means is higher than a second preset steering angular velocity and the vehicle velocity detected by said vehicle velocity detecting means is higher than a second preset vehicle velocity.

5. A vehicle suspension apparatus according to claim 1, wherein said communicaton control means produces a fifth control signal for opening said communication control valve means when said steering state detecting means detects that the steering direction of said steering wheel is in the return direction toward the neutral position and the steering angular velocity is lower than the first preset angular velocity and when said vehicle velocity detecting means detects that the vehicle velocity is lower than a third preset vehicle velocity.

6. A vehicle suspension apparatus according to claim 1, wherein said communication control means and said roll control means comprise a controller with a microcomputer.

7. A vehicle suspension apparatus comprising:
fluid spring chambers arranged as suspension units for supporting respective vehicle wheels;
fluid supply means for supply a fluid to each of said fluid spring chambers through supply control valve means;
fluid exhaust means for exhausting the fluid from each of said fluid spring chambers through exhaust control valve means;
communicating means for communicating each of said fluid spring chambers of the left suspension units with each of said fluid spring chambers of the right suspension units through communication control valve means;
steering state detecting means for detecting the steering state of a steering wheel;
roll control means for producing a second control signal for opening the desired one of said supply control valve means for a first preset time so as to supply a preset amount of a fluid to said fluid spring chambers of the contracted suspension units and opening the desired one of said exhaust control valve means for said first preset time so as to exhaust a preset amount of the fluid from said fluid spring chambers of the stretched suspension units when said steering state detecting means and vehicle velocity detecting means detect a factor which causes rolling of a vehicle body; and
communication control means for supplying a first control signal to said communicating means so as to open said communication control valve means when said steering state detecting means detects the steering angle falls within a preset neutral range and to close said communication control valve means when said steering state detecting means detects that the steering angle falls outside the neutral range, said communication control means supplying a third control signal to said communicating means so as to open said communication control valve means when said steering state detecting means detects, after control by said roll control means, that the steering direction of said steering wheel is in a return direction toward a neutral position and the steering angular velocity is higher than a first preset steering angular velocity, said communication control means supplying a fourth control signal to close said communication control valve means for a fourth preset time when said steering state detecting means detects, during a third preset time period after a second preset time from production of the third control signal, that the steering angle falls within the neutral range, and said roll control means producing a fifth control signal for opening the desired one of said supply and exhaust control valve means for a fifth preset time so as to perform roll control in an opposite direction to that based on the second control signal supplied rom said communication control means, when said communication control means produces the fourth control signal.

8. A vehicle apparatus according to claim 7, wherein said roll control means determines that the factor which causes rolling of the vehicle body is present when the steering angular velocity detected by said steering state detecting means is higher than a second preset steering angular velocity and the vehicle velocity detected by said vehicle velocity detecting means is higher than a first preset vehicle velocity.

9. A vehicle suspension apparatus according to claim 7, wherein said communication control means produces a sixth control signal to open said communication control valve means when said steering state detecting means detects that the steering direction of said steering wheel is in the return direction toward the neutral position and the steering angular velocity is lower than the first preset steering annular velocity and said vehicle velocity detecting means detects that the vehicle velocity is lower than a second preset vehicle velocity.

10. A vehicle suspension apparatus according to claim 7, wherein said communication control means and said roll control means comprise a controller with a microcomputer.

11. A vehicle suspension apparatus comprising:
air spring chambers arranged as suspension units for supporting respective vehicle wheels;
air supply means for suppling air to each of said air spring chambers through supply control valve means;
air exhaust means for exhausting the air from each of said air spring chambers through exhaust control valve means;
communicating means for communicating said air spring chambers of the left suspension units with said air spring chambers of the right suspension units through communication control valve means;
steering state detecting means for detecting the steering state of a steering wheel;
roll control means for producing a second control signal for opening the desired one of said supply control valve means for a first preset time so as to supply a preset amount of air to said air spring chambers of the contracted suspension units and opening the desired one of said exhaust control valve means for said first preset time so as to exhaust a preset amount of the air from said air spring chambers of the stretched suspension units when said steering state detecting means and vehicle velocity detecting means detect a factor which causes a rolling of a vehicle body; and communication control means for supplying a first control signal to said communicating means so as to open said communication control valve means when said steering state detecting means detects that the steering angle falls within a preset neutral range and to close said communication control vavle means when said steering state detecting means detects that the steering angle falls outside the neutral range, said communication control means supplying a third control signal to said communicating means so as to open said communication control valve means when said steering state detecting means detects, after control by said roll control means, that the steering direction of said steering wheel is in a return direction toward a neutral position and the steering angular velocity is higher than a first preset steering angular velocity, and said communication control means supplying a fourth control signal to close said communication control valve means for a fourth preset time when said steering state detecting means detects, during a third preset time period after a second preset time from production of the third control signal, that the steering angle falls within the neutral range.

12. A vehicle suspension apparatus according to claim 11, wherein said air supply means has a compressor and a first reserve tank for containing compressed air supplied from said compressor.

13. A vehicle suspension apparatus according to claim 12, wherein said air exhaust means has a second reserve tank for containing air exhausted from said air spring chambers, and a suction side of said compressor is connected to said second reserve tank.

* * * * *

UNITED STATES PATENT AND TRADEMARK OFFICE
CERTIFICATE OF CORRECTION

PATENT NO. : 4,697,237
DATED : September 29, 1987
INVENTOR(S) : Tadao Tanaka et al.

It is certified that error appears in the above—identified patent and that said Letters Patent is hereby corrected as shown below:

Column 14, line 17, cancel "appartus" and insert --apparatus--.

Column 14, line 61, cancel "angularly" and insert --angular--.

Column 15, line 39, cancel "for supply" and insert --for supplying--.

Column 16, line 53, cancel "suppling" and insert --supplying--.

Column 17, line 15, cancel "vavle" and insert --valve--.

Signed and Sealed this

Tenth Day of May, 1988

*Attest:*

DONALD J. QUIGG

*Attesting Officer*     *Commissioner of Patents and Trademarks*